Aug. 20, 1935.                B. LOEFFLER                    2,011,642
            METHOD OF MANUFACTURING STEEL MOTORS
                     Filed Oct. 18, 1933.        6 Sheets-Sheet 1
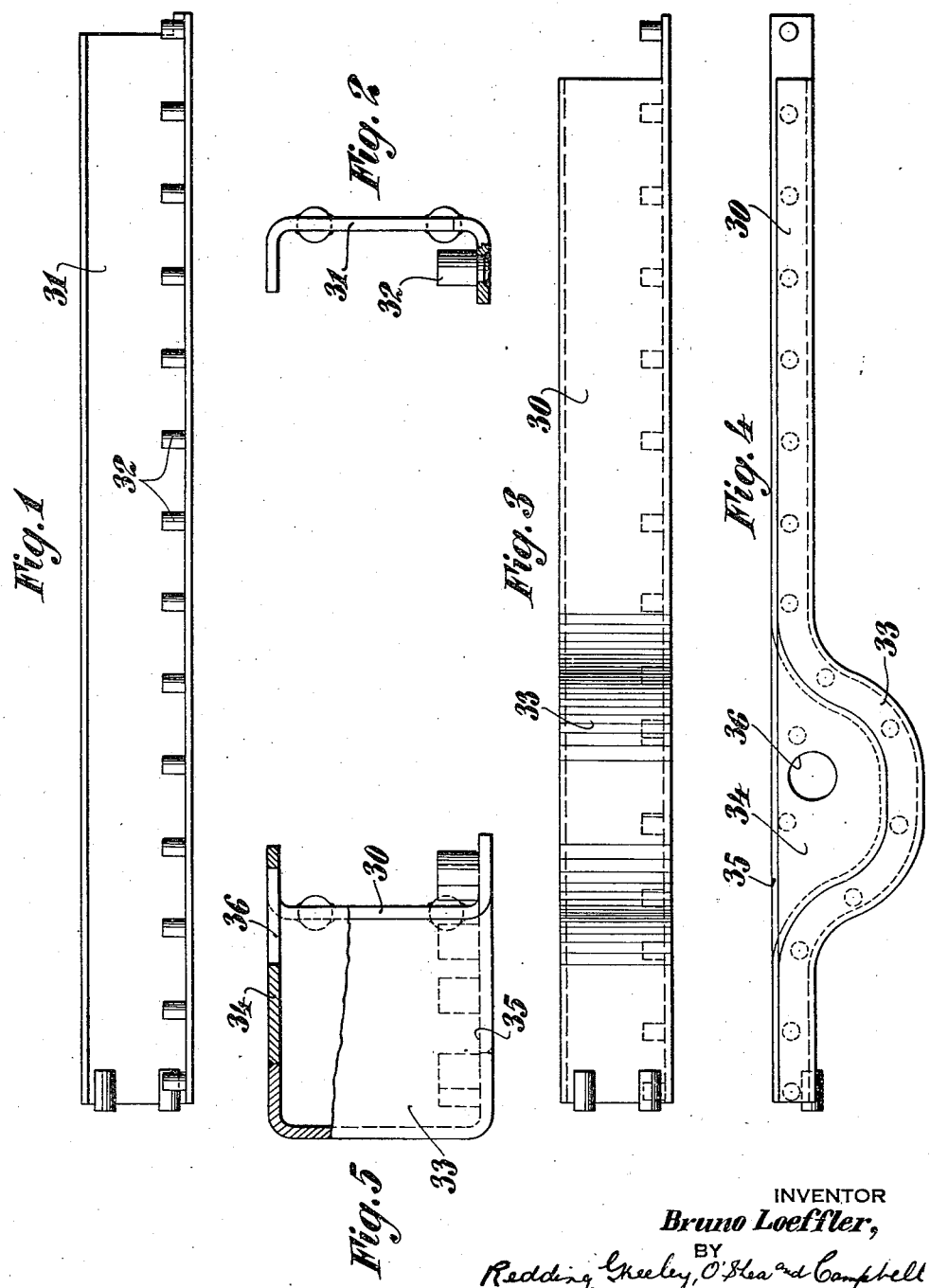
INVENTOR
*Bruno Loeffler,*
BY
Redding, Greeley, O'Shea and Campbell
HIS ATTORNEYS Aug. 20, 1935.  B. LOEFFLER  2,011,642
METHOD OF MANUFACTURING STEEL MOTORS
Filed Oct. 18, 1933  6 Sheets-Sheet 2
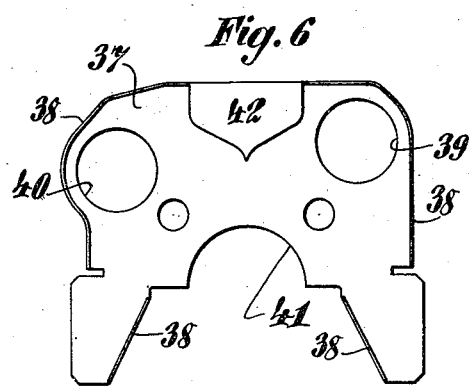
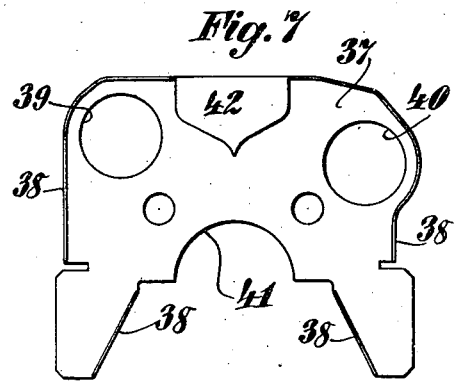
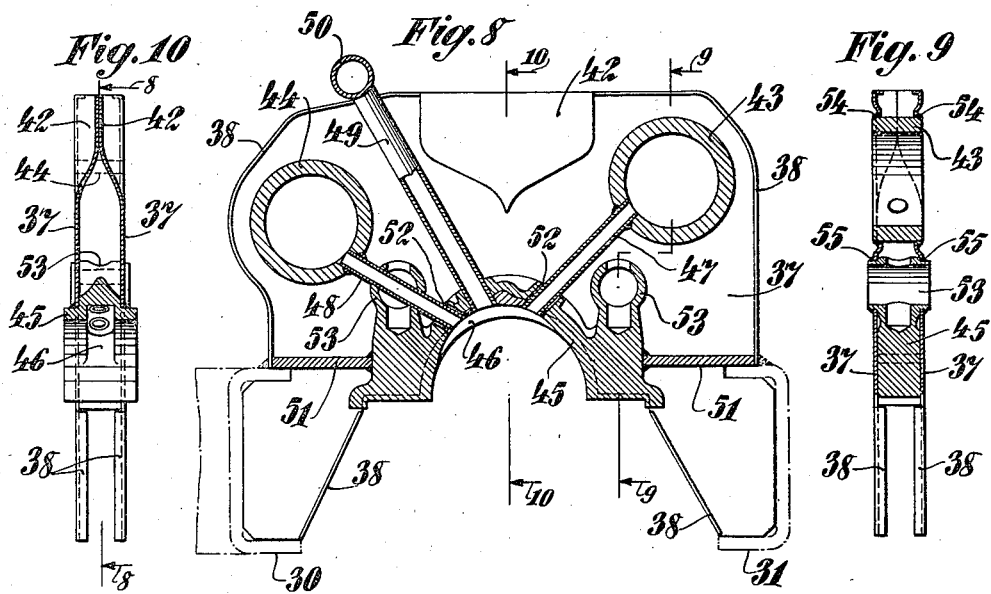
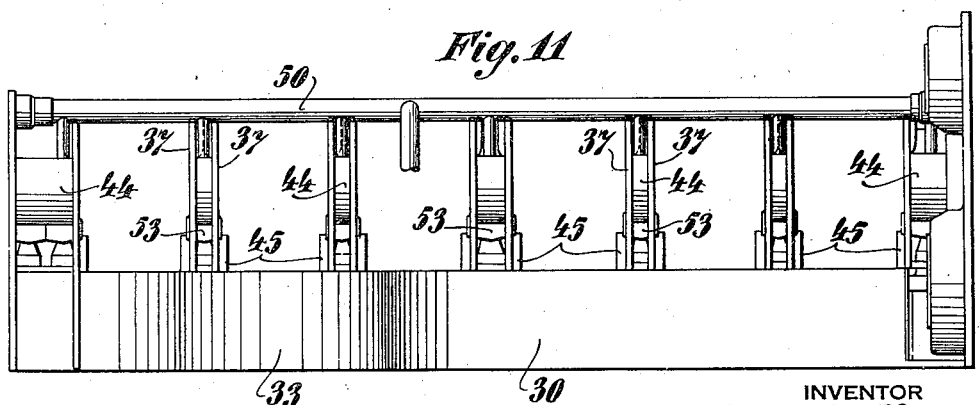
INVENTOR
Bruno Loeffler,
BY
Redding, Greeley, O'Shea and Campbell
HIS ATTORNEYS Aug. 20, 1935.                 B. LOEFFLER                    2,011,642
                    METHOD OF MANUFACTURING STEEL MOTORS
                           Filed Oct. 18, 1933          6 Sheets-Sheet 3
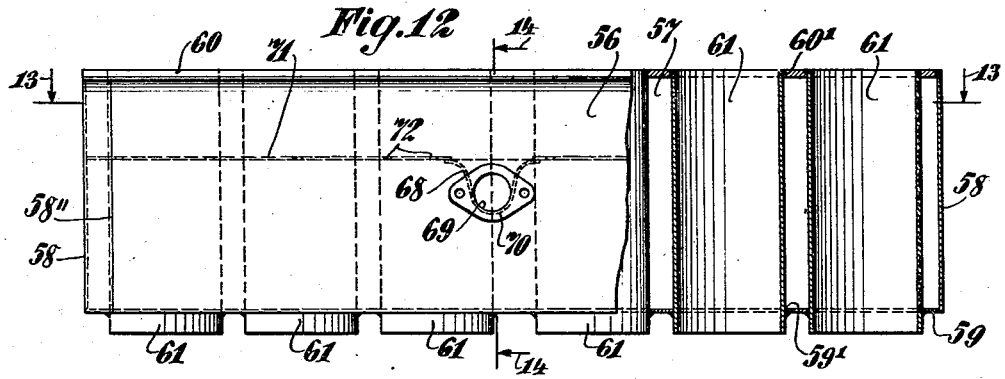
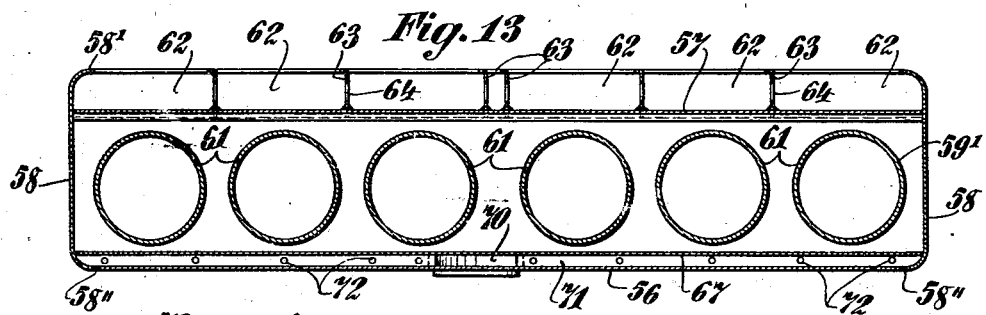
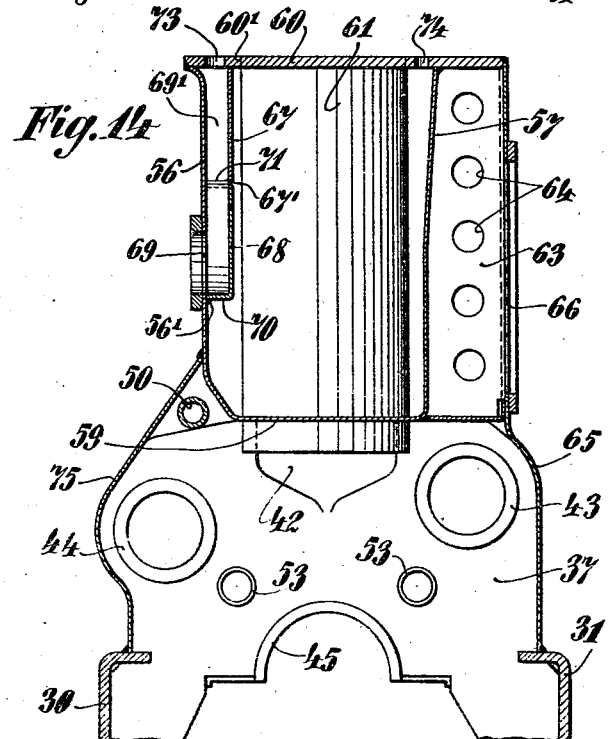
INVENTOR
*Bruno Loeffler,*
BY
*Redding Greeley, O'Shea & Campbell*
HIS ATTORNEYS Aug. 20, 1935.  B. LOEFFLER  2,011,642
METHOD OF MANUFACTURING STEEL MOTORS
Filed Oct. 18, 1933   6 Sheets-Sheet 4
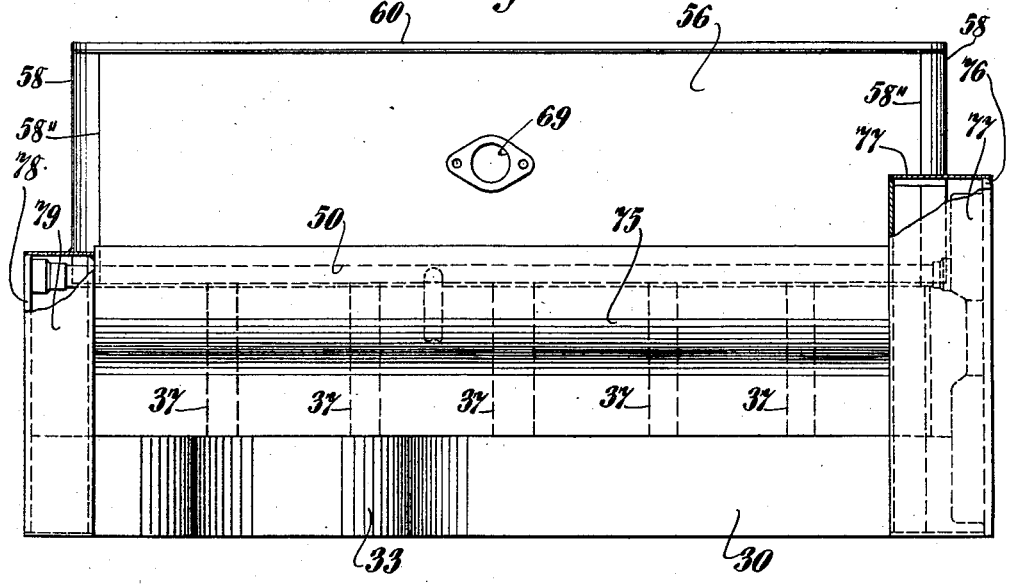
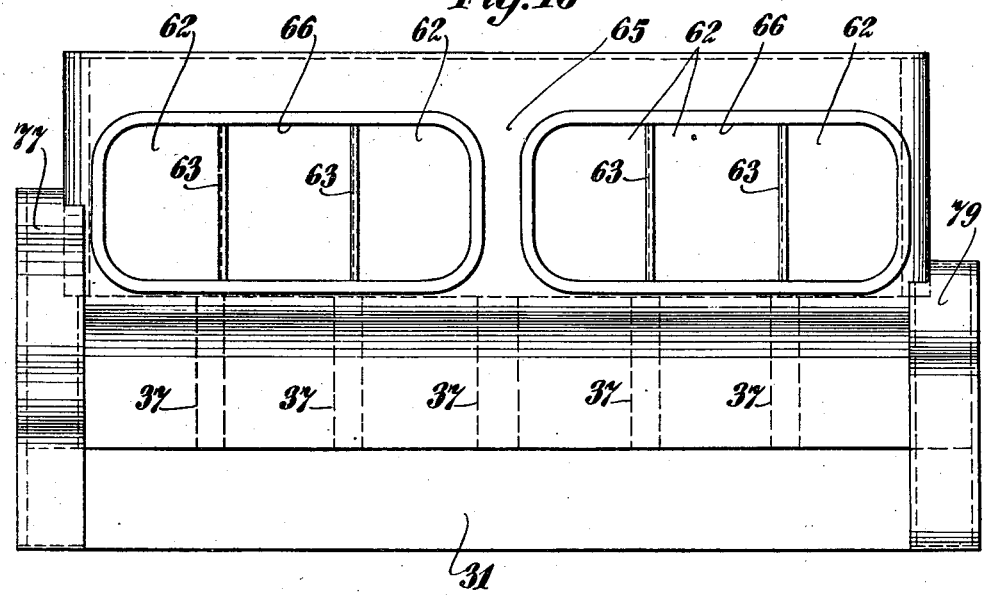
INVENTOR
*Bruno Loeffler,*
BY
*Redding, Greeley, O'Shea and Campbell*
HIS ATTORNEYS

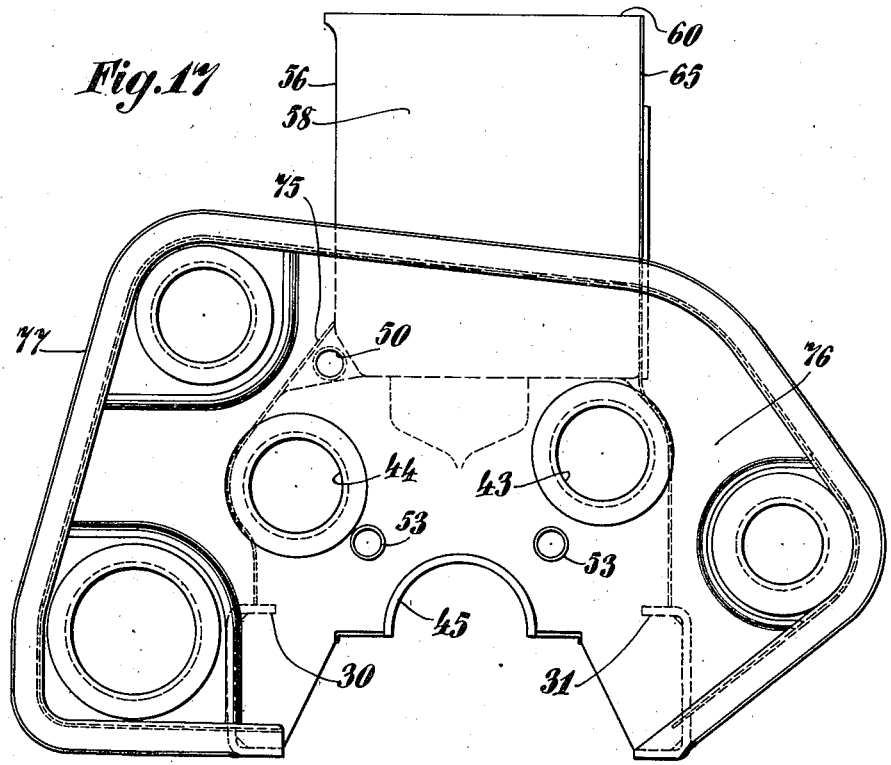
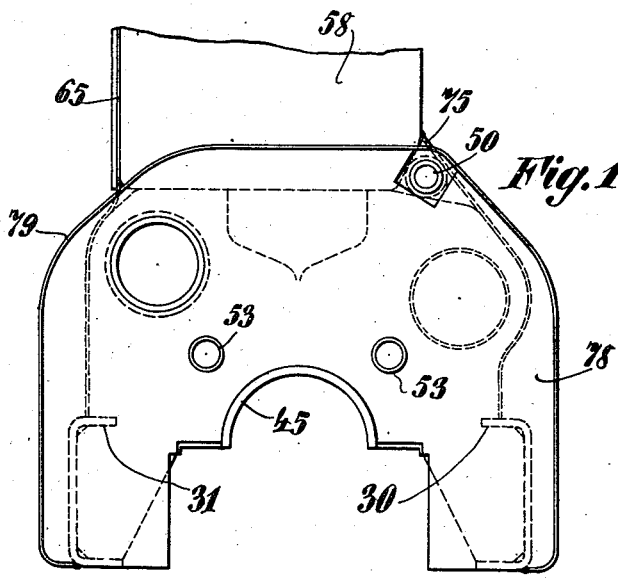

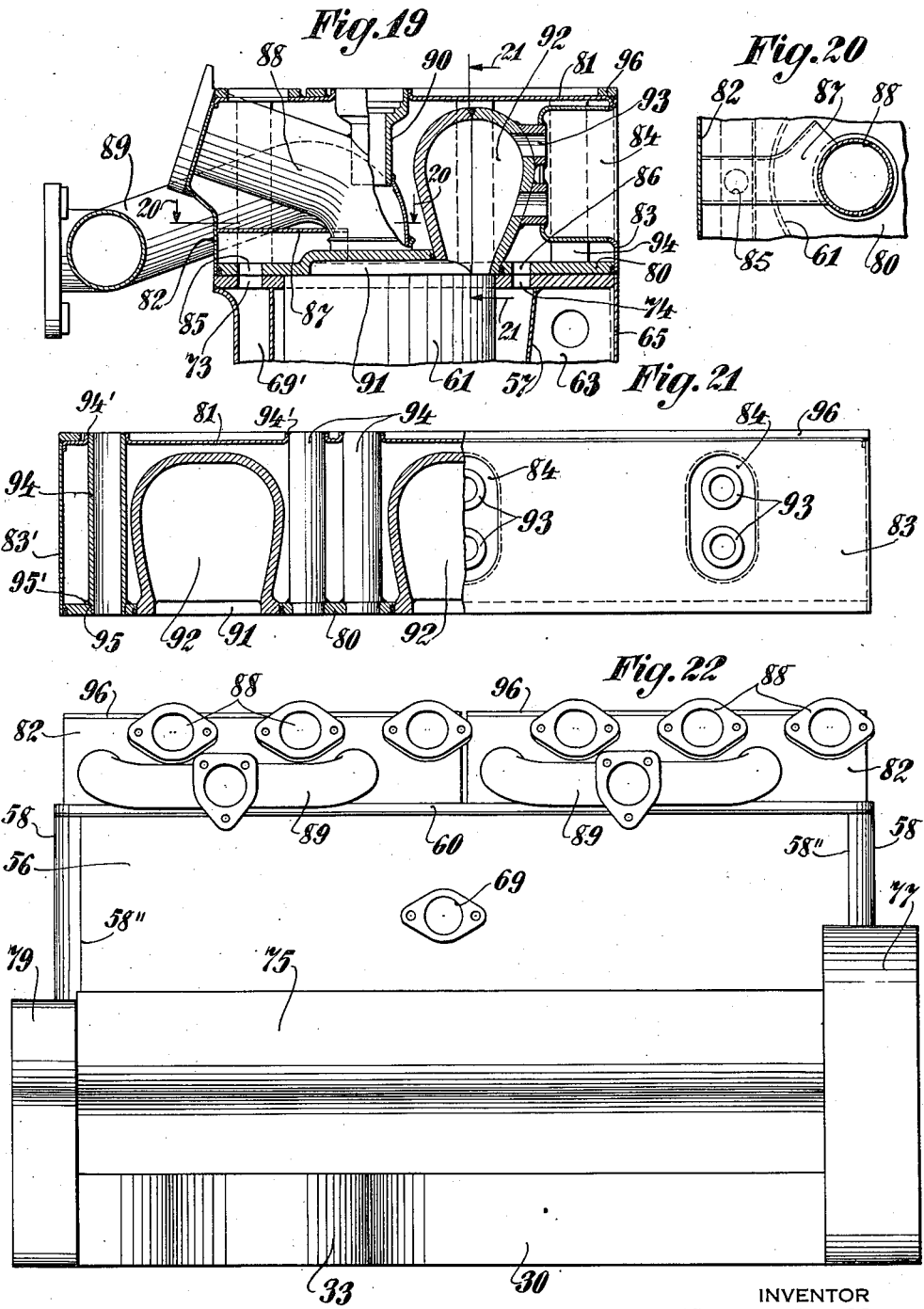

Patented Aug. 20, 1935

2,011,642

UNITED STATES PATENT OFFICE 2,011,642

METHOD OF MANUFACTURING STEEL MOTORS

Bruno Loeffler, Plainfield, N. J., assignor to International Motor Company, New York, N. Y., a corporation of Delaware Application October 18, 1933, Serial No. 694,043

1 Claim. (Cl. 29—156.4)

The present invention relates to internal combustion engines and embodies, more specifically, a method of manufacturing an improved engine by means of which the weight for a given horse power is substantially decreased over existing forms of engines, and the strength of which is much greater than the strength of similarly rated engines now available.

The practice commonly followed in manufacturing internal combustion engines has been to form such engines of units which have been cast of iron. The principal elements of engines so formed have been the cylinder block, the head, and the crank case and the weight of the completed engine reflects the weighty nature of the cast elements thereof. Designers have, for a number of years, endeavored to reduce the weight of engines but a practical limit is immediately placed upon the factor of weight by reason of the strength and stress resisting characteristics of cast iron.

Attempts have been made to produce engines formed of sheet steel but, until the present time, these attempts have been unsuccessful because the strength of the resulting engine structure has been inadequate or because the cost has been prohibitive.

An object of the present invention is to provide an engine or motor formed of ductile metallic elements assembled and united by welding.

A further object of the invention is to provide an improved method of manufacturing a welded steel engine having much less weight per horse power and much greater strength and stress resisting qualities than engines heretofore designed, the elements being of such character as to facilitate the manufacture and assembly thereof.

Further objects not specifically enumerated above, will be apparent as the invention is described in greater detail in connection with the accompanying drawings, wherein:

Figure 1 is a view in side elevation, showing one of the side channel members of an engine constructed in accordance with the present invention.

Figure 2 is a view in end elevation, showing the channel member of Figure 1.

Figure 3 is a view in front elevation showing the other and complementary channel member of an engine constructed in accordance with the present invention.

Figure 4 is a top view of the channel member shown in Figure 3.

Figure 5 is a view in end elevation, showing the channel member of Figures 3 and 4, the figures being broken away and partially in section to illustrate the manner in which bridge members are utilized to reinforce the channel.

Figure 6 is a view in front elevation showing one plate of a bulkhead assembly constructed in accordance with the present invention.

Figure 7 is a view in front elevation of a complementary bulkhead plate construction to be assembled with the plate shown in Figure 6.

Figure 8 is a view in section, showing a typical bulkhead with oil lines and taken on the line 8—8 of Figure 10, looking in the direction of the arrows.

Figure 9 is a view in section, taken on line 9—9 of Figure 8, and looking in the direction of the arrows.

Figure 10 is a view in section, taken on line 10—10 of Figure 8, and looking in the direction of the arrows.

Figure 11 is a view in side elevation showing the crank case and channel construction of an engine constructed in accordance with the present invention, this view illustrating an engine having end plates and five intermediate bulkheads constructed in accordance with the present invention.

Figure 12 is a view in side elevation, partly broken away and in section, showing a cylinder block constructed in accordance with the present invention.

Figure 13 is a view in horizontal section, taken on line 13—13 of Figure 12, and looking in the direction of the arrows.

Figure 14 is a view in transverse section through the cylinder block shown in Figure 12, and taken on line 14—14 thereof, this view further showing a sectional view of the crank case portion of the engine.

Figure 15 is a view in side elevation of the improved engine taken from the right as viewed in Figure 14, and showing the elements thereof in outline.

Figure 16 is a similar view in side elevation, taken from the left as viewed in Figure 14.

Figure 17 is a view in end elevation, taken from the right in Figure 15 and showing the structure of Figure 15.

Figure 18 is a view in end elevation, taken from the left, as viewed in Figure 15 and showing the structure of Figure 15.

Figure 19 is a view in transverse section, taken through the head of an engine constructed in accordance with the present invention.

Figure 20 is a detail view in section, taken on the line 20—20 of Figure 19, and looking in the direction of the arrows.

Figure 21 is a view in side elevation of the head shown in Figure 19, this view being broken away and in section on the line 21—21 of Figure 19, and looking in the direction of the arrows.

Figure 22 is a view in side elevation of the complete improved engine.

It will be seen from the drawings that the present invention provides an engine having a crank case, cylinder block and head formed of fabricated structures comprising steel plates of suitable shape, welded together. The sections of the engine, after being assembled and welded, are secured together suitably, the crank case and the cylinder block being welded together as a unit and the head being removably secured on the cylinder block as will be readily apparent from Figures 19, 21 and 22.

In order that the engine structure may be more readily understood, the description thereof will first be directed to the several sections and the manner of manufacturing and assembling the same, the crank case being described first.

As shown in Figures 8 and 11, the crank case section of the engine is mounted upon parallel channel members 30 and 31, these members being shown in detail in Figures 1 through 5. The right hand channel member shown in Figures 1 and 2, is formed with studs 32 along the lower flange thereof which are subsequently drilled and thus serve as a means for securing the engine to a suitable support. The left hand channel member 30 is formed with a bulge 33, this bulge receiving the oil pump and being provided with top and bottom filler plates 34 and 35, respectively. A recess 36 may be formed in the top plate 34 in order that a fluid line may be received therethrough.

Between the channel members 30 and 31, crank case bulkhead sections and end plates are secured at suitably spaced points. These bulkhead sections are shown in Figures 6 through 11 and comprise similarly formed plates 37 having certain portions of the opposed edges thereof turned over to form flanges 38. Apertures 39 are formed in the plates 37 to receive bearings for the cam shaft while spaced apertures 40 are formed in the plates to receive bearings for the idler gear shaft. The plates are further cut away at 41 to receive crank shaft bearing members, as clearly shown in Figures 8, 9, and 10.

Adjacent the top portion of each of the cooperating plates 37, pressed-in portions 42 are formed, these portions being adapted to engage each other when the plates are assembled to space the bulkhead plates properly. In assembling the elements, cam shaft bearings 43 are secured in the spaced apertures 39 while idler gear shaft bearings 44 are secured in the spaced apertures 40. Main bearings 45 are secured in the recesses 41 and are provided with oil grooves 46 which are adapted to communicate with the cam and idler gear shaft bearings 43 and 44 by conduits 47 and 48, respectively. An oil pipe 49 communicates with the groove 46 of the main bearing member and establishes communication with the oil feed line 50. Reinforcing plates 51 are secured between the plates 37 and are welded to the main bearings to afford adequate strength in the bulkheads adjacent the bearings.

In assembling the foregoing elements which form the bulkheads, the main bearing 45 is spot welded to one of the plates 37. The conduits 47 and 48 are then welded to the respective bearings 43 and 44 and these assemblies are then secured to the plate 37 to which the bearing 45 has been secured. In assembling these elements with the previously assembled plate and bearing 45, the conduits 47 and 48 are snaked into slightly oversized holes 52 formed in the bearing 45 and then welded thereto. The bearings 43 and 44 are of sufficient length to project beyond the sides of the plates 37 in order that adequate strength may be afforded against movement of the bearing members in the plane of the bulkhead. After the bearing assemblies have been secured to the first plate 37, the complementary plate is placed over the foregoing elements and then welded in like relation to the parts.

In order that adequate strength to meet the stresses in the plane of the bulkhead, may be provided in the bearing member 45, this member is formed with hollow lugs 53 which extend beyond the assembled plates 37. In this fashion, spaced welds 54 and 55 serve to secure the bearings 43, 44 and 45 effectively in the bulkhead against stresses tending to displace them transversely of the engine and, conversely, to act as trusses in uniting the plate 37 securely.

After the elements have been assembled in the foregoing relationship and completely welded, the bearings are bored and the main bearing drilled, tapped and faced in order that bearing caps may be secured thereto. The idler gear shaft bearings 44, of course, are mounted only in such bulkheads as carry the idler gear shaft.

The bulkhead units thus formed are then welded to the side channels 30 and 31 as indicated by the dot and dash lines of Figure 8 and the full lines of Figure 14, and the cylinder block section is mounted upon the crank case section also as shown in Figure 14, and now to be described.

The cylinder block section is shown in detail in Figures 12, 13 and 14 and consists of elements formed of sheet steel and properly shaped, being assembled and secured in position by welding operations, as described hereinafter. The elements of the block comprise side walls 56 and 57 which are formed from a single plate of metal which is bent into a generally U-shaped cross section, as shown in Figure 14. This plate thus forms the side walls 56 and 57, together with a bottom wall 59 within which apertures 59' are formed to receive the cylinder sleeves described hereinafter. Side wall 56 is further provided with an aperture 69 through which water may be introduced into the cooling ducts later described. The end walls of the cylinder section are formed of a steel plate which is also bent into a generally U-shaped cross section, the parallel portions of the plate serving as end walls 58 for the cylinder section, and the connecting portion of the plate as a backwall 58'. The edges of the end wall 58 are welded at 58'' to the edges of the side wall 56, thus forming a completely connected outer surface. The back wall 58' is spaced from the side wall 57 and partition members 63 are welded to the wall 57 to form push rod compartments 62. The partition members 63 are formed with apertures 64 which serve as breather holes, the partition members 63 extending upwardly and being adapted to abut against a cylinder deck 60 which is welded to the top edges of the walls of the cylinder section, as shown in Figure 14. The cylinder deck 60 is formed with apertures 60' which are adapted to be aligned with the apertures 59' to receive cylinder sleeves 61. These cylinder sleeves are welded between the cylinder deck 60 and the bottom wall 59 and, being spaced from the side and end walls of the cylinder block section, form a chamber therewith within which a cooling medium may be circulated.

In order that the cooling of the engine may be accomplished effectively, the cooling medium is introduced through the aperture 69 and is received within a manifold 69' which is formed by a plate 67 terminating in a flanged lower portion which forms a bottom wall 71 of the manifold. To the bottom wall 71 is secured a downwardly extending continuation 70 which is formed upon a plate 68. The plate 68 and portion 70 are welded to the plate 67 at 67' and to the side wall 56 at 56'. In this fashion, the aperture 69 communicates with the cooling fluid manifold 69' in order that the cooling fluid may be introduced into the manifold properly. Apertures 72 are formed in the bottom wall 71 and permit a limited quantity of the cooling fluid to flow directly into the chamber formed between the cylinder sleeves 61 and the walls of the cylinder block section. In as much as the cylinder sleeves do not require the intensive cooling required by the engine head, it is preferable to direct the relatively low temperature cooling fluid directly into the head and the restricted apertures 72 thus perform this function, permitting only a limited quantity of the fluid to flow directly into the cylinder block section. Apertures 73 and 74 permit the cooling fluid to flow from the manifold 69 and cylinder block section, respectively, into the head which will be described subsequently.

In assembling the cylinder block section, the U-shaped plate forming the side walls 56 and 57 is secured to the U-shaped plate forming the end walls 58 and back wall 58' by welding the same at 58''. The partition members 63 are then welded in position and the cooling manifold formed by welding the plates 67 and 68 to the side wall 56. After welding the cylinder sleeve 61 to the cylinder deck 60, the sub-assembly formed thereby is welded to the sub-assembly of the walls previously formed, thus forming the completed cylinder block section. This section is then welded to the bulkheads of the crank case section and a side plate 75 welded between the side wall 56 and the corresponding channel member of the crank case section. A side plate 65 is also welded to the opposite side of the crank case and cylinder section assembly, being welded to the cylinder deck 60 at one side thereof and to the corresponding channel member of the crank case section. This side plate is preferably formed with hand holes 66 to facilitate the inspection and repair of the mechanism within the push rod compartments. The upper extremity of the side plate 75, of course, serves as a closure for the oil line 50 as clearly shown in Figure 15.

As shown in Figures 15, 16, 17, and 18, the end bulkheads for the crank case section of the engine differ from the remaining bulkheads in that the outer plates thereof are sufficiently large to accommodate timing gears and other standard mechanism. The right hand end bulkhead 76, as viewed in Figure 15, includes bearings for the said gears and other mechanism, an outer wall 77 serving as a closure therefor. The left hand end bulkhead 78 is suitably formed to receive the necessary mechanism and is provided with an outside cover plate 79, the cover plates 77 and 79 being welded in position during the proper finishing operations.

The engine head section is formed of a bottom deck 80 and a top plate 81, these elements being secured together by means of a front plate 82 which is welded to the adjacent edges of the elements to form the front wall of the head. Also welded to the sides and back of the deck and plate 81 is a plate 83 which is formed with parallel portions 83' which constitute the side or end walls of the head. The edges of these walls, as previously noted, are welded to the deck 80 and top plate 81 to form a complete closure for the elements. The back plate 83 is formed with a plurality of spark plug pockets 84, the bottom deck being provided with apertures 85 and 86 to cooperate with the respective apertures 73 and 74 to facilitate the flow of the cooling fluid into the head from the supply manifold 69' and the cylinder block cooling chamber, respectively. Over the apertures 85, baffles 87 are provided in order that the relatively cool fluid may be directed against the exhaust valve seats which are formed in the bottom deck 80.

Within the head section, exhaust pipes 88 are welded, inlet pipes 89 also being welded in position to complete the inlet and exhaust mechanism.

The bottom deck 80 is formed with a recess 91 above each cylinder in the cylinder block. These recesses communicate with combustion chambers 92 which are preferably offset with respect to the axes of the cylinders as described in applicant's copending application Ser. No. 694,044 filed October 18, 1933. In as much as this combustion chamber construction is covered in such copending application, a detailed description thereof herein is unnecessary, the combustion chamber being welded to the bottom plate 80 and provided with spark plug bosses 93 which are welded thereto and to the pocket forming portions 84 of the plate 83. Valve guides 90 are welded to the pipes 88 and 89 and to the top plate 81 which is formed with apertures to receive the same. Between the top plate 81 and bottom deck 80, hollow studs 94 are secured, the upper extremities of the studs being welded at 94' to the top plate 81 and the bottom extremities thereof being formed with shoulders 95 which rest upon the bottom deck 80 and are welded thereto at 95' thus serving as a positive spacing means for the top plate and bottom deck. Upon the top plate, oil rings 96 are welded, the elements of the head being assembled as follows.

The inlet and exhaust pipes are first welded to the respective valve guides 90. The spark plug bosses 93 are welded to the combustion chambers and the inlet and exhaust pipes together with the combustion chambers are then welded to the bottom deck 80. The studs 94 are likewise welded to the bottom plate and the top plate 81 and rings 96, after being welded together are welded to the studs 94 and guides 90, after which the front plate 82, back plate 83 and side plate 83' are welded to the adjacent edges of the plate 81 and bottom deck 80, the spark plug pocket forming portions 84 of the plate 83 being welded to the studs 93. The complete assembly is then adapted to be secured to the cylinder block section in any suitable fashion.

From the foregoing, it will be seen that an engine has been provided formed with a crank case section, a cylinder block section and a head section, each of which is formed of a plurality of steel plates which are welded together easily and effectively to form a completed section. The sections are adapted to be welded together and plates secured thereto to form a completed engine assembly which possesses great strength with a considerable decrease in weight over standard forms of engines.

While the invention has been described with specific reference to the accompanying drawings, it is not to be limited, save as defined in the appended claim.

I claim as my invention:

The method of assembling an engine having bulkheads therein comprising spot welding a main bearing to a bulkhead plate, welding conduits to idler and cam shaft bearings, welding the last named conduits and bearings to the said bulkhead plate, welding a second bulkhead plate to the bearings, boring the bearings, spotting side channel members to a plurality of the bulkheads, spotting a cylinder section to the bulkheads, completing the welding of the bulkheads to the channels and cylinder section, and welding side plates to the channels and cylinder block section.

BRUNO LOEFFLER.